US011382272B2

(12) United States Patent
Schwefe et al.

(10) Patent No.: US 11,382,272 B2
(45) Date of Patent: Jul. 12, 2022

(54) TRACTION BELT FOR AN INCLINED CONVEYOR OF A COMBINE HARVESTER

(71) Applicant: ContiTech Antriebssysteme GmbH, Hannover (DE)

(72) Inventors: Thorsten Schwefe, Isernhagen (DE); Jan-Henning Quass, Bergen (DE); Andre Kucharczyk, Guelden (DE); Eduard Lorenz, Isernhagen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 299 days.

(21) Appl. No.: 16/711,455

(22) Filed: Dec. 12, 2019

(65) Prior Publication Data

US 2020/0196529 A1 Jun. 25, 2020

(30) Foreign Application Priority Data

Dec. 20, 2018 (DE) ...................... 10 2018 222 481.1

(51) Int. Cl.
| | |
|---|---|
| *A01D 61/02* | (2006.01) |
| *A01D 61/00* | (2006.01) |
| *F16G 3/06* | (2006.01) |
| *B65G 15/52* | (2006.01) |
| *B65G 19/10* | (2006.01) |
| *F16G 3/02* | (2006.01) |

(52) U.S. Cl.
CPC ............ *A01D 61/02* (2013.01); *A01D 61/008* (2013.01); *B65G 15/52* (2013.01); *B65G 19/10* (2013.01); *F16G 3/02* (2013.01); *F16G 3/06* (2013.01)

(58) Field of Classification Search
CPC ...... A01D 61/02; A01D 61/008; A01D 57/20; B65G 15/52; B65G 19/10; B65G 15/36; B65G 15/42; F16G 3/02; F16G 3/06
See application file for complete search history.

(56) References Cited

U.S. PATENT DOCUMENTS

| | | | | |
|---|---|---|---|---|
| 981,312 | A * | 1/1911 | Robins .................. | D03D 15/00 428/193 |
| 2,305,044 | A * | 12/1942 | Toews .................... | B65G 15/42 198/690.2 |
| 2,633,227 | A * | 3/1953 | Hutchins ............... | B65G 15/34 198/847 |
| 2,793,150 | A * | 5/1957 | Deaves ................. | B29D 29/00 198/847 |
| 3,574,022 | A * | 4/1971 | Lampert ............... | B65G 15/34 156/88 |

(Continued)

FOREIGN PATENT DOCUMENTS

| | | |
|---|---|---|
| DE | 102009036104 A1 | 2/2011 |
| DE | 102013109579 A1 * | 3/2015 ............ B65G 15/52 |

(Continued)

*Primary Examiner* — Arpad Fabian-Kovacs
(74) *Attorney, Agent, or Firm* — David L. Cate; Gregory Adams (57) ABSTRACT

A traction belt (2) for an inclined conveyor (12) of a combine harvester (1), with a traction belt body (20) which extends substantially in the longitudinal direction (X) of the belt (2) and is endlessly closed or designed to be endlessly closable. The traction belt (2) has at least one tension strand (22) which runs in the longitudinal direction (X) is embedded in the traction belt body (20) and is enclosed by the traction belt body (20).

19 Claims, 4 Drawing Sheets

(56) References Cited

U.S. PATENT DOCUMENTS

| | | | | |
|---|---|---|---|---|
| 3,584,516 A * | 6/1971 | Burpulis | ............... | F16G 5/166 |
| | | | | 474/265 |
| 3,661,245 A * | 5/1972 | Mol | ............... | B65G 15/34 |
| | | | | 198/688.1 |
| 3,900,627 A * | 8/1975 | Angioletti | ............... | B65G 15/34 |
| | | | | 428/114 |
| 4,004,467 A * | 1/1977 | Kenney | ............... | B65G 15/34 |
| | | | | 198/321 |
| 4,553,663 A * | 11/1985 | Johnson | ............... | A01D 61/02 |
| | | | | 198/465.1 |
| 4,838,843 A * | 6/1989 | Westhoff | ............... | B29D 29/08 |
| | | | | 474/205 |
| 4,899,868 A * | 2/1990 | Johnson | ............... | A01D 61/02 |
| | | | | 198/520 |
| 5,141,101 A * | 8/1992 | Vance | ............... | B65G 15/34 |
| | | | | 198/821 |
| 6,352,488 B1 * | 3/2002 | Morris | ............... | F16G 1/28 |
| | | | | 474/260 |
| 6,419,775 B1 * | 7/2002 | Gibson | ............... | B32B 25/16 |
| | | | | 156/137 |
| 6,605,014 B2 * | 8/2003 | Isshiki | ............... | F16G 1/28 |
| | | | | 428/172 |
| 6,616,558 B2 * | 9/2003 | South | ............... | F16G 5/20 |
| | | | | 474/260 |
| 7,235,028 B2 * | 6/2007 | Martin | ............... | F16G 1/28 |
| | | | | 474/264 |
| 8,596,447 B2 * | 12/2013 | Gentz | ............... | B65G 15/52 |
| | | | | 198/731 |
| 8,932,165 B2 * | 1/2015 | Knox | ............... | F16G 1/28 |
| | | | | 474/205 |
| 9,255,201 B2 * | 2/2016 | Feng | ............... | F16G 5/06 |
| 9,388,879 B2 * | 7/2016 | Takaba | ............... | F16G 5/20 |
| 9,593,445 B2 * | 3/2017 | Akiyama | ............... | F16G 1/28 |
| 10,149,437 B2 * | 12/2018 | Van Overschelde | ... | A01F 12/10 |
| 10,220,545 B2 * | 3/2019 | Lofgren | ............... | B29C 70/34 |
| 10,405,491 B2 * | 9/2019 | Peters | ............... | A01F 12/10 |
| 10,514,083 B2 * | 12/2019 | Gregg | ............... | F16G 5/08 |
| 10,647,516 B2 * | 5/2020 | Peters | ............... | A01F 12/10 |
| 10,687,468 B1 * | 6/2020 | Wood | ............... | A01D 61/02 |
| 10,731,726 B2 * | 8/2020 | Thomas | ............... | F16G 5/20 |
| 2004/0195079 A1 | 10/2004 | Webster et al. | | |
| 2004/0214676 A1 * | 10/2004 | Shiriike | ............... | F16G 5/06 |
| | | | | 474/260 |
| 2010/0004082 A1 * | 1/2010 | Di Meco | ............... | B32B 25/14 |
| | | | | 474/205 |
| 2012/0186949 A1 | 7/2012 | Gentz | | |
| 2017/0245437 A1 | 8/2017 | Hülsmann et al. | | |

FOREIGN PATENT DOCUMENTS

| | | | | |
|---|---|---|---|---|
| DE | 102015118143 A1 * | 4/2017 | ............ | B65G 15/44 |
| DE | 102016002144 A1 | 8/2017 | | |
| DE | 102018112047 A1 * | 11/2019 | ............ | A01D 61/02 |
| DE | 102019213022 A1 * | 3/2021 | ............ | F16G 3/02 |
| EP | 2842409 A1 | 3/2015 | | |

* cited by examiner

TRACTION BELT FOR AN INCLINED CONVEYOR OF A COMBINE HARVESTER

The present invention concerns a traction means, preferably a belt, for an inclined conveyor of a combine harvester according to the preamble of claim 1, an inclined conveyor for a combine harvester with such a traction means according to claim 13, and a combine harvester with such an inclined conveyor according to claim 14.

Combine harvesters for facilitating the harvesting of crops, e.g. cereals, have been known for a long time. By means of a combine harvester, the crop is cut and threshed on the field in order to separate the grains from the straw. The stalks of the cereal are captured by means of a reel, cut by cutter bars arranged horizontally close to the ground, and supplied via an intake worm screw arranged behind this to an inclined conveyor which conveys the stalks into the interior of the combine harvester in order to be processed further. The region of the inclined conveyor may be described as an intake channel or shaft of the combine harvester.

Normally, the inclined conveyor has at least two endlessly closed traction means running parallel to each other, which are always connected together in pairs in the transverse direction by means of several carrier bars. The carrier bars are evenly spaced apart from each other in the conveying direction, in the longitudinal direction or in the endlessly closed direction. The carrier bars can press the cut crop from above onto the inside of the lower shaft floor and thereby deliver this obliquely upward into the interior of the combine harvester toward the threshing device.

It is known to use steel chains as traction means in combination with corresponding pinions of the gears or sprockets. Steel chains are however comparatively heavy, which can increase the overall weight of the combine harvester. Also, correspondingly powerful drives may be required to drive the heavy steel chains of the inclined conveyor, which can increase the energy consumption of the combine harvester and further increase the weight of the combine harvester. Steel chains may also cause comparatively loud noises in operation.

Furthermore, lubricants such as oil which are required for the use of steel chains may soil the crop and cause the adhesion of sand or similar, which, because of the resulting tribological system, may increase the wear on the steel chains and thereby reduce their service life. This may also lead to lengthening of the steel chains, i.e. to an increase in the extent of the steel chains in the longitudinal direction, so that individual teeth of the steel chains may jump on the gearwheels or sprockets. These jumps can reduce the drive power and cause additional sudden strains on the steel chains, which may further shorten their service life. Overly extended steel chains may require replacement, which can lead to additional costs in material and time. Also, replacement in the harvest field may only be possible with great difficulty if at all.

Alternatively, it is known to use rubber belts as traction members. Usually, toothed belts are used in combination with corresponding gearwheels or toothed disks. This can avoid or at least reduce the above-mentioned disadvantages of steel chains. However, a rubber belt cannot itself transmit high forces in the conveying direction. Therefore rubber belts have previously been used in inclined conveyors of combine harvesters only with embedded fabric layers, so that the forces can be transmitted in the conveying direction by the fabric layers as traction members. However, in this case the rubber belt may stretch in the conveying direction, which disadvantageously can lead to the above-mentioned jumps at the gearwheels or toothed disks. This applies in particular to rubber belts subjected to relatively high strains.

DE 10 2009 036 104 A1 concerns an inclined conveyor for combine harvesters with at least two endless traction means running parallel to each other, which are equipped with fixing means for the carrier bars connecting them. In order to provide as a traction means a belt with adequate endurance tensile strength for use in an inclined conveyor for combine harvesters, the traction means are endlessly wound studded belts made from cross-linked polymer reinforced with fabric layers.

The disadvantage with the traction means from DE 10 2009 036 104 A1 is that a belt made from cross-linked polymer reinforced with fabric layers has limited capacity for transmitting forces in the conveying direction. In other words, the power transmission is greatly restricted.

One object of the present invention is to provide a traction means for an inclined conveyor of a combine harvester of the type described initially which can transmit higher forces or higher power in the conveying direction than the known traction means. Alternatively or additionally, an elongation of the traction means in the conveying direction during operation should be avoided or at least reduced. It is at least the intention to provide an alternative to known traction means.

The object is achieved according to the invention by means of a traction means having the features of claim 1, an inclined conveyor having the features of claim 13, and a combine harvester having the features of claim 14. Advantageous developments are described in the dependent claims.

Thus the present invention concerns a traction means, preferably a belt, for an inclined conveyor of a combine harvester, with a traction means body which extends substantially in the longitudinal direction of the belt and is endlessly closed or designed to be endlessly closable. Here the traction means may be produced both integrally endlessly closed, or open and then closed.

The traction means is characterized in that at least one tension strand which runs in the longitudinal direction is embedded in the traction means body and is enclosed by the traction means body. A tension strand means a body extending linearly over a specific length, which can transmit traction forces in its linear extension direction. The tension strand may also be referred to as a traction cable. The tension strand may consist of individual fibers or be formed as one piece. In any case, the tension strand is designed to transmit in linear fashion, in the longitudinal direction, the traction forces which may occur during operation of the inclined conveyor. Any material and any geometry suitable for achieving this in the respective application may be used for the tension strand.

The present invention is based on the knowledge that, in comparison with a chain or a fabric-containing body, a tension strand may have a significantly smaller elongation. In comparison with a chain e.g. a steel chain, this is because a chain comprises individual links which move relative to each other in operation and can therefore wear due to the resulting friction such that an elongation can occur in the linear extension direction of the traction means. In comparison with a fabric-containing body such as e.g. a cross-linked polymer reinforced by fabric layers, this is because a fabric naturally has a degree of stretchability in its superficial extent which can lead to an elongation in the linear extension direction of the traction means.

Thus according to the invention, the traction forces occurring in an inclined conveyor can be transmitted by means of the tension strand without elongation occurring, or so that the elongation is sufficiently small to prevent jumping of the traction means. In other words, the possible power transmission can be increased.

According to one aspect of the present invention, a plurality of tension strands is embedded in the traction means body, wherein the tension strands are arranged spaced apart from each other in the transverse direction. This can multiply the effect of the tension strands. Their effect perpendicularly to the linear extension direction of the traction means may also be distributed more evenly over the traction means.

According to a further aspect of the present invention, at least one region free from tension strands lies between at least two tension strands in the transverse direction. In this way, regions of the traction means may be created for connecting any further elements to the traction means through or into the traction means body without damaging the tension strands.

According to a further aspect of the present invention, in at least one region free from tension strands, the traction means body has at least one passage opening which extends through the traction means body in the vertical direction. In this way, another element can be fixed at this point through the traction means body without having to cut into the traction means body.

According to a further aspect of the present invention, the traction means body comprises polyurethane, preferably consists of polyurethane. This allows use of the material properties of polyurethane in such a traction means. This may also simplify production of the traction means, since the traction means can be produced by means of extrusion instead of vulcanization, as in the case of a traction means body made from rubber. This may also lead to cost savings. Furthermore, surrounding the tension strand by the material of the traction means body in this way is comparatively easy and/or process-reliable.

According to a further aspect of the present invention, the tension strand comprises as a material steel, polyester, aramide, glass fiber and/or carbon, preferably consists of steel, polyester, aramide, glass fiber or carbon. All these materials have a comparatively high tensile strength, so that the desired minimal elongation in the longitudinal extension direction can be achieved by use of one of these materials or by use of a combination of these materials with each other or with other materials.

According to a further aspect of the present invention, the traction means comprises a plurality of teeth which extend in the vertical direction toward the same side of the traction means body and in the transverse direction, and are spaced apart from each other in the longitudinal direction. This achieves a profiling of the traction means so as to cooperate with the toothed disks of the drive of the inclined conveyor and be able to transmit drive forces.

According to a further aspect of the present invention, at least two teeth are spaced apart from each other in the longitudinal direction by a tooth-free region, wherein the width of the tooth-free region corresponds to the width of a tooth. In this way, a carrier bar can be arranged at this point of the tooth-free region in order to connect the traction means to a further traction means in the transverse direction. At the same time, the omitted tooth may be replaced by the carrier bar.

According to a further aspect of the present invention, the traction means comprises a carrier bar which is fixedly connected to the traction means body and extends substantially in the transverse direction, wherein the carrier bar is connected by means of at least one fixing means, preferably by means of a pair of fixing means, to an inner holder element which extends substantially parallel to the carrier bar in the transverse direction, wherein the carrier bar and the inner holder element surround at least portions of the traction means body on both sides in the vertical direction, wherein the carrier bar and/or the fixing means and/or the inner holder element are arranged in a recess of the traction means body. In this way, the corresponding holding element, fixing means or inner holding element may be held against the traction means body by form fit, so that the carrier bar can be connected to the traction means body easily, quickly or with comparatively high load-bearing capacity with respect to forces in the longitudinal direction. Here, use of a pair of fixing means, which are preferably spaced apart from each other in the transverse direction and parallel to each other in the longitudinal direction, can promote the grip and improve the hold. An uneven force transmission can also be avoided.

According to a further aspect of the present invention, the traction means has at least two traction means ends in the longitudinal direction, by means of which the traction means is endlessly closed or designed to be endlessly closable, wherein the two ends overlap in the transverse direction and/or in the vertical direction or are designed to overlap in the transverse direction and/or the vertical direction. The overlapping of the traction means ends may create a suitable contact face which can be used for force-fit holding of the two traction means ends by suitable contact forces of a corresponding mechanical connection. In addition or alternatively, the traction means ends may also be surrounded and held by form fit by the same holding element, fixing means or inner holding element so that a more secure connection of the two traction means ends may thereby be achieved.

According to a further aspect of the present invention, the traction means comprises at least one outer holder element which is connected by means of at least one fixing means, preferably by means of a pair of fixing means, to an inner holder element which extends substantially parallel to the outer holder element in the transverse direction, wherein the outer holder element and the inner holder element surround at least portions of the traction means body on both sides in the vertical direction, wherein the outer holder element and/or the fixing means and/or the inner holder element are arranged in a recess of the traction means body. In this way, the properties previously described for such a connection may be applied not only for a carrier bar but also in comparable fashion for connecting two traction means ends.

According to a further aspect of the present invention, the recess is arranged in a tooth. In this way, the necessary depth in the material of the traction means body can be provided by the tooth in order to create a sufficiently deep recess which can guarantee a sufficient form-fit hold. This may be achieved without reducing the traction means body at the tooth-free regions, which could weaken the traction means.

The present invention also relates to an inclined conveyor for a combine harvester having a traction means as described above. In this way, the traction means according to the invention with its properties and advantages may be applied to an inclined conveyor for a combine harvester.

The present invention also relates to a combine harvester having an inclined conveyor as described above. In this way, the inclined conveyor according to the invention with its properties and advantages may be applied to a combine harvester.

Several exemplary embodiments and further advantages of the invention will be described below in conjunction with the following figures, in which.

The description of the abovementioned figures is given in Cartesian coordinates with a longitudinal direction X, a transverse direction Y oriented perpendicularly to the longitudinal direction X, and a vertical direction Z oriented perpendicularly both to the longitudinal direction X and also to the transverse direction Y. The longitudinal direction X may also be referred to as the depth X, the transverse direction Y as the width Y, and the vertical direction Z as the height Z.

Figure 1:
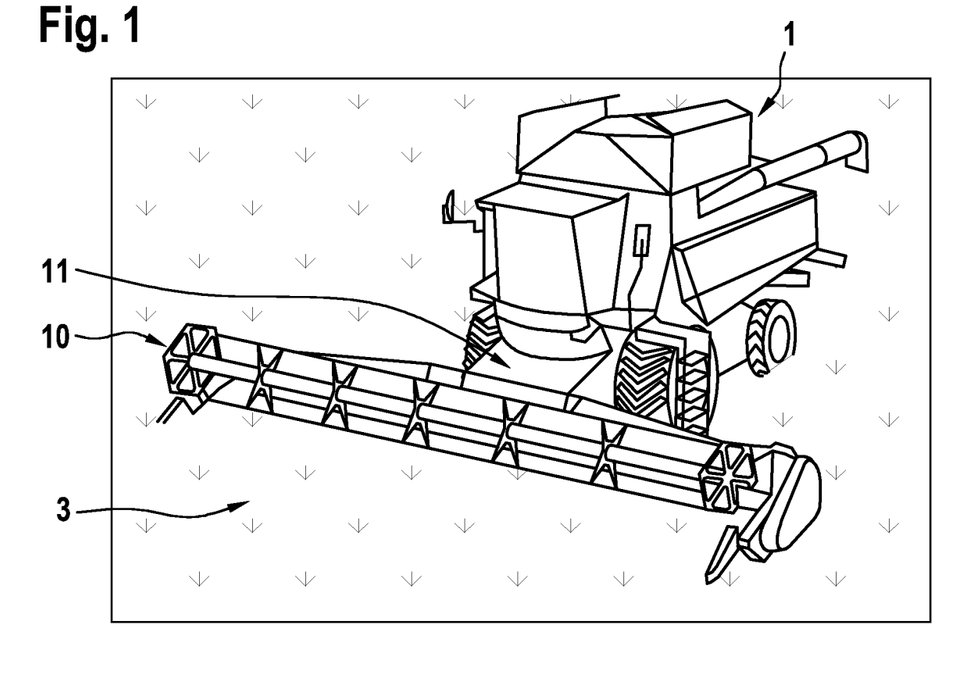
FIG. 1 shows a perspective schematic representation of a combine harvester according to the invention.
Figure 2:
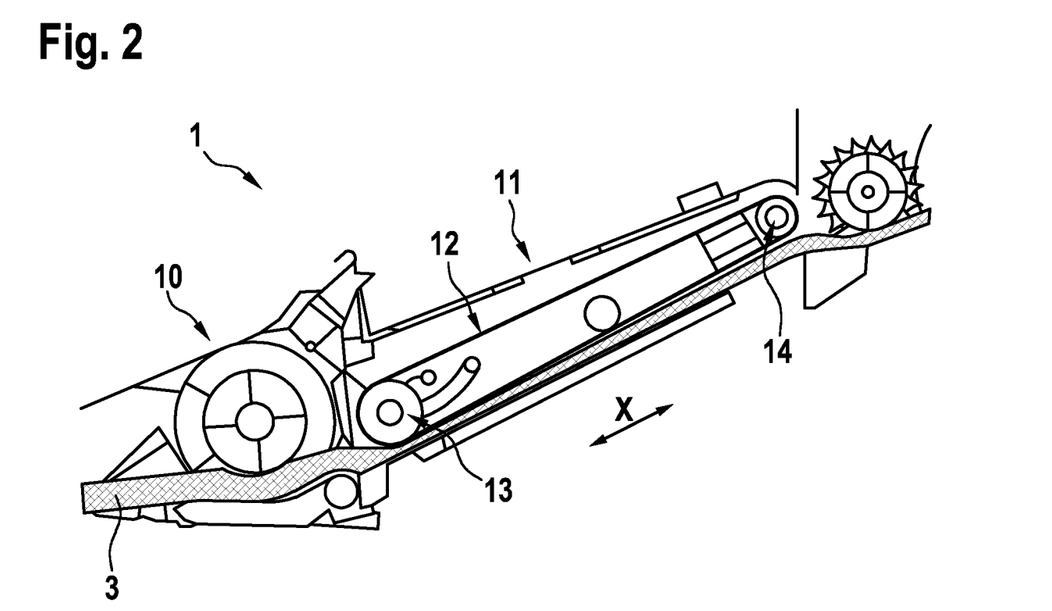
FIG. 2 shows a schematic sectional representation of a front part of the combine harvester from FIG. 1.
Figure 3:
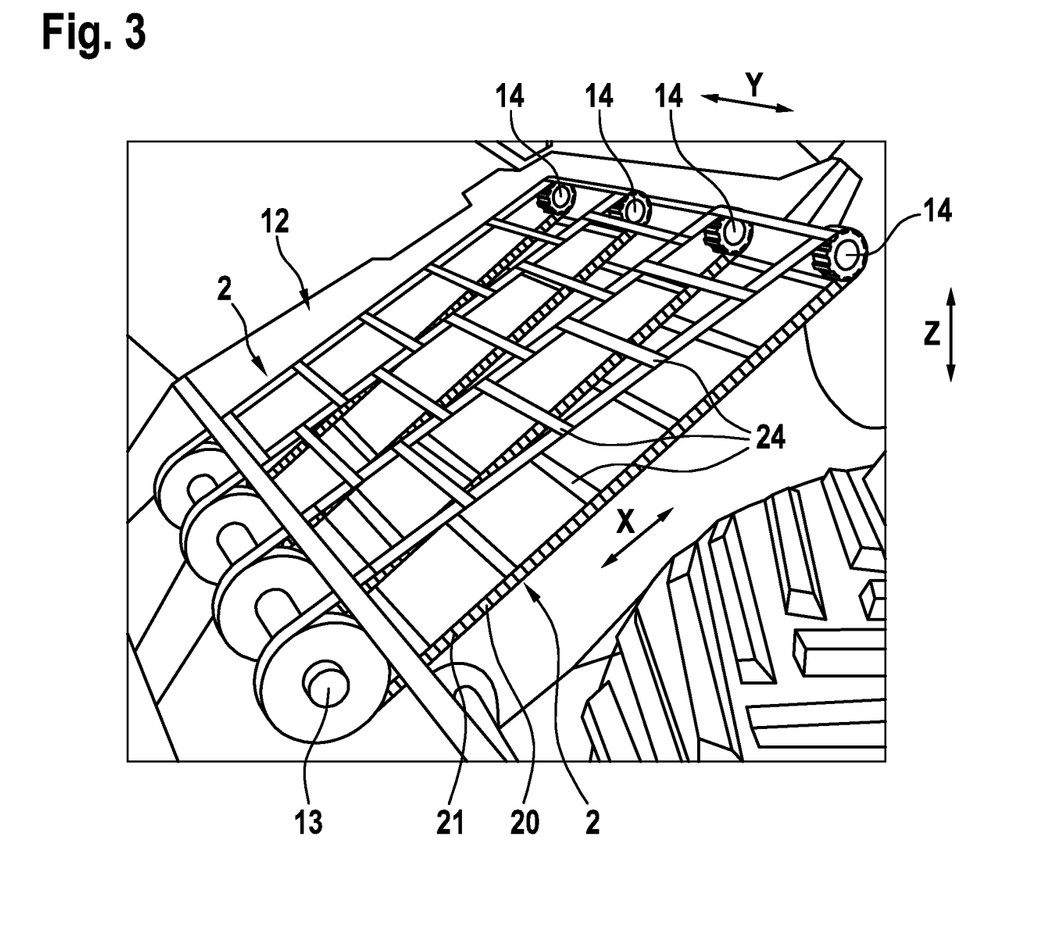
FIG. 3 shows a perspective schematic representation of a combine harvester according to the invention.

FIG. 1 shows a perspective schematic representation of a combine harvester 1 according to the invention. FIG. 2 shows a schematic sectional representation of a front part of the combine harvester 1 from FIG. 1. FIG. 3 shows a perspective schematic representation of an inclined conveyor 12 according to the invention.

The combine harvester 1 in the depiction of FIG. 1 has just harvested a crop 3 in the form of cereal 3 from a field. At its front end in the direction of travel, the combine harvester 1 has a reel 10 in order to supply the cereal 3 or its stalks to an intake channel 11, see FIG. 2. The intake channel 11 may also be described as a shaft 11. An inclined conveyor 12 is arranged in the intake channel 11 and extends substantially in its longitudinal direction X, see FIGS. 2 and 3. The inclined conveyor 12 runs around a drive roller 13 and a deflection roller 14, see FIGS. 2 and 3.

The inclined conveyor 12 has several traction means 2 in the form of belts 2 which are each endlessly closed and arranged parallel to each other. The belts 2 run substantially in the longitudinal direction X, and are spaced evenly apart from one another in the transverse direction Y. Four belts 2 are used in the representation in FIGS. 2 and 3. The belts 2 each have a traction means body 20 which consists substantially of polyurethane. The sides of the belts 2 oriented toward the inside in the depictions of FIGS. 2 and 3 each comprise a plurality of teeth 21, which each extend in the transverse direction Y and in principle are evenly spaced apart from each other in the longitudinal direction X.

Figure 4:
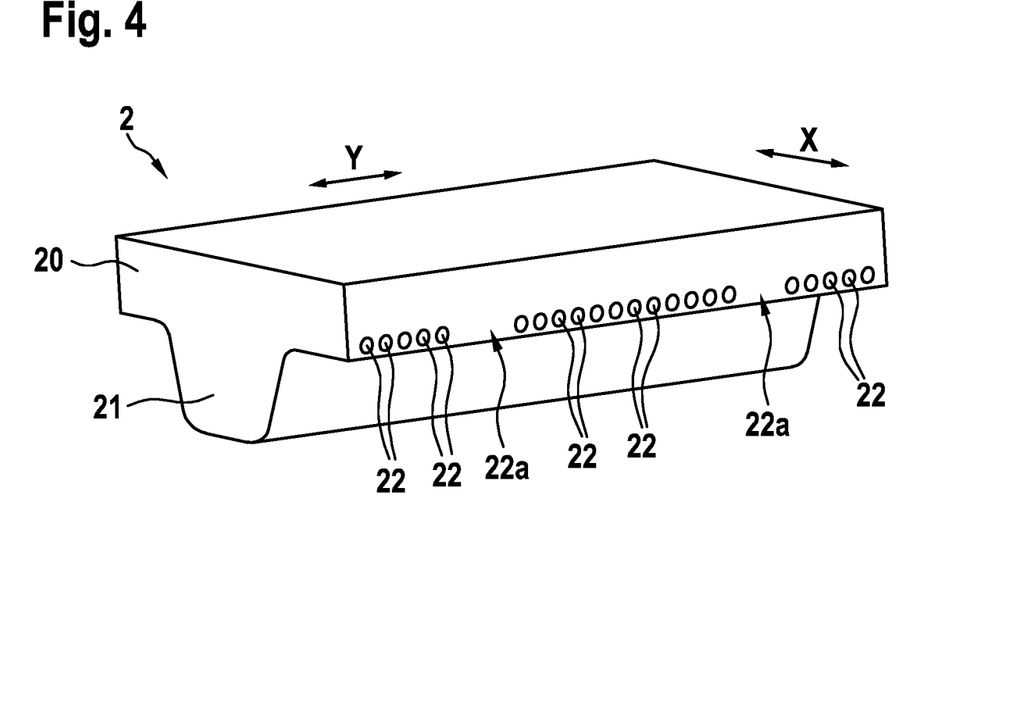
FIG. 4 shows a schematic, perspective sectional representation of a traction means according to the invention in a first exemplary embodiment.
Figure 5:
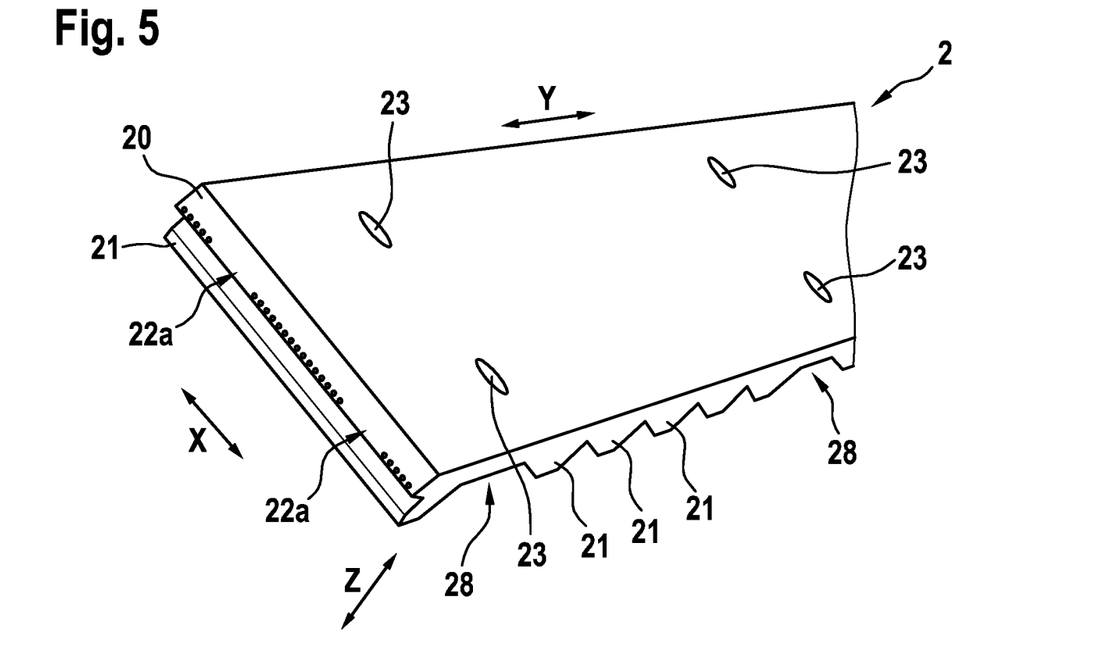
FIG. 5 shows a further schematic, perspective sectional representation of the traction means according to the invention in the first exemplary embodiment from FIG. 4.

FIG. 4 shows a schematic, perspective sectional representation of a traction means 2 according to the invention in a first exemplary embodiment. FIG. 5 shows a further schematic, perspective sectional representation of the traction means 2 according to the invention in the first exemplary embodiment from FIG. 4.

In order to improve the transmission of traction forces in the longitudinal direction X, the belt 2 according to the invention, in the first exemplary embodiment, has a plurality of tension strands 22 in the form of tension cables 22 which each extend in the longitudinal direction X and are arranged parallel to each other in the transverse direction Y. For example, steel cables 22, polyester cables 22, aramide cables 22 or also carbon cables 22 may be used as tension strands 22 or tension cables 22. This may avoid or at least adequately reduce or delay an elongation of the tension strands 22 and hence an elongation of the belt 2 in the longitudinal direction X as its longitudinal extension direction, so that any jumping of the belt 2 or its teeth 21 on the drive roller 13 and/or on the deflection roller 14 may be avoided or at least reduced.

As evident from a combined view of FIGS. 4 and 5, the belt 2 according to the first exemplary embodiment has two regions 22a in the transverse direction Y which are free from tension strands. In other words, no tension strands 22 run in the regions 22a free from tension strands. In this way, the regions 22a free from tension strands may be used for the provision of passage openings 23 through the traction means body 20 in the vertical direction Z, through which fixing means 25 such as e.g. bolts 25 may be guided in order e.g. to fixedly mount carrier bars 24 to the traction means body 20, see for example FIG. 3. The passage openings 23 are provided in pairs in order to improve the holding of the carrier bars 24. For this, one of the teeth 21 may be omitted at the location of the passage openings 23 in order to create a tooth-free region 28. The tooth 21 may be replaced by the carrier bar 24 at this point.

Figure 6:
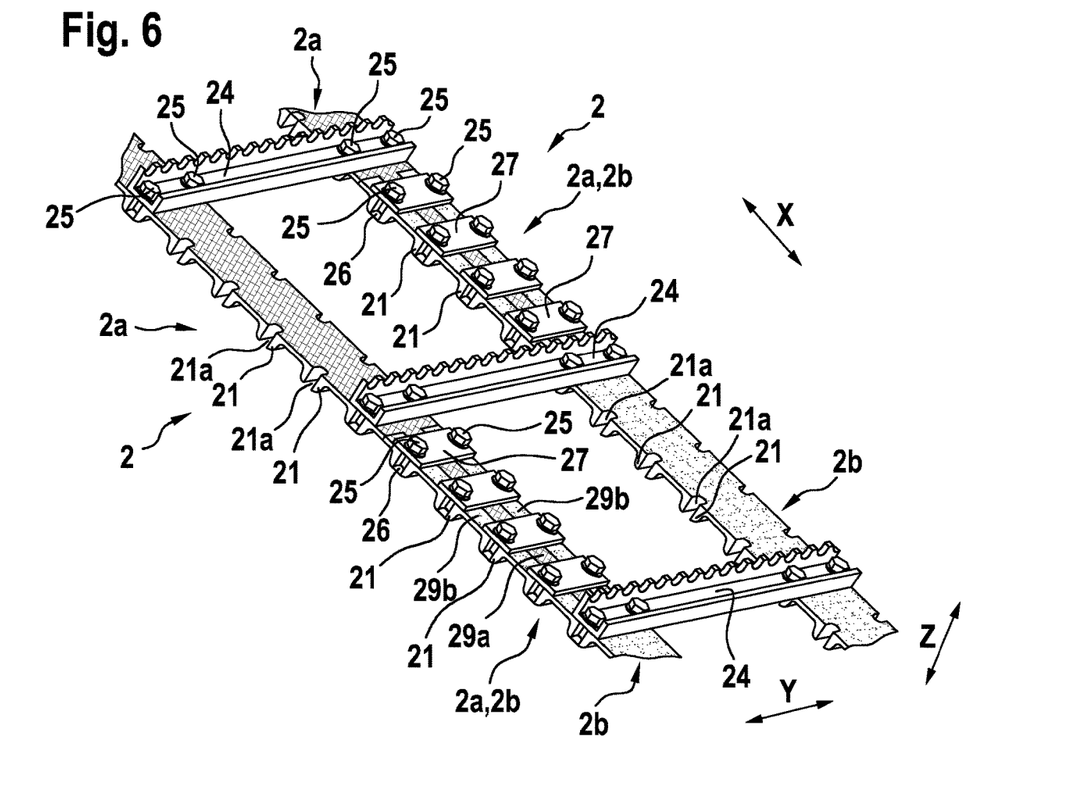
FIG. 6 shows a schematic, perspective sectional representation of a traction means according to the invention in a second exemplary embodiment.
Figure 7:
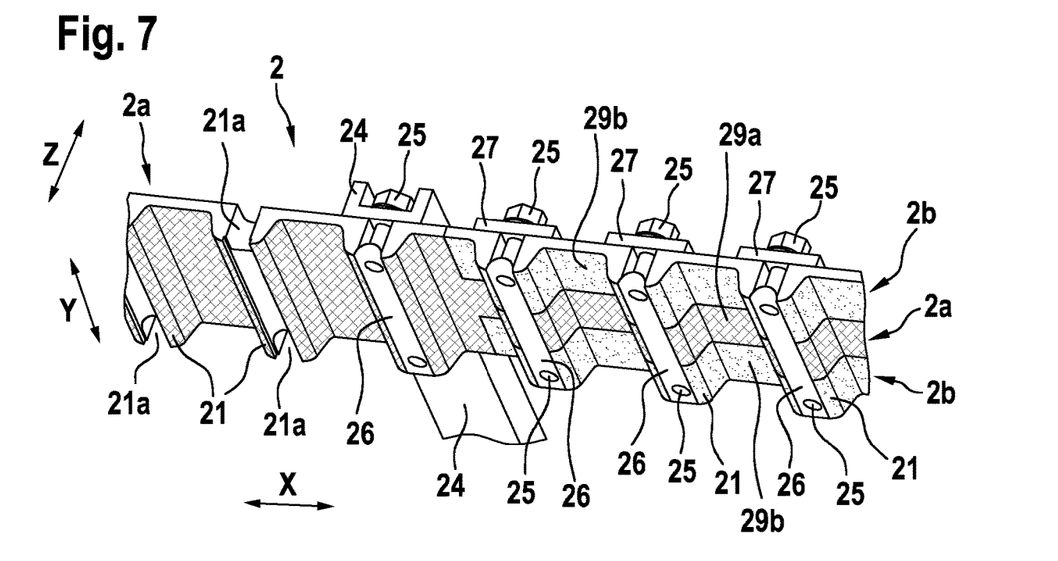
FIG. 7 shows a further schematic, perspective sectional representation of the traction means according to the invention in the second exemplary embodiment from FIG. 6.

FIG. 6 shows a schematic, perspective sectional representation of a traction means 2 according to the invention in a second exemplary embodiment. FIG. 7 shows a further schematic, perspective sectional representation of the traction means 2 according to the invention in the second exemplary embodiment from FIG. 6.

As already stated, several such belts 2 as traction means 2 may be arranged parallel to each other in the inclined conveyor 12 of FIGS. 2 and 3, and be connected together in pairs by means of the carrier bars 24. The carrier bars 24 may be secured as shown in the first exemplary embodiment of a belt 2 according to the invention in FIGS. 4 and 5.

Alternatively, both associated belts 2 may also each have a recess 21a per tooth 21, which extends through the material of the tooth 21 in the vertical direction Z and in the transverse direction Y, on both sides of the tooth 21 in the transverse direction Y. The recess 21a thus runs around the tooth 21 in an approximate U-shape, open toward the outside. The top or outside of the belt body 20 has no recess. The portion of the recess 21a running in the transverse direction Y holds a respective inner holding element 26, which may also be described as an inner transverse element 26 because of its substantially linear extension in the transverse direction Y. The inner holding element 26 here runs parallel to the carrier bars 24 which are each held relative to each other, perpendicularly in the vertical direction Z, by two fixing means 25 in the form of bolts 25. This may be achieved by corresponding internal threads of the inner holding element 26 (not shown) and passage openings of the carrier bar 24 (not shown). This may achieve a more secure hold of the carrier bar 24 without perceptibly changing the contour of the tooth 21 relative to the drive roller 13 or deflecting roller 14.

FIGS. 5 and 6 furthermore show the possibility of producing the belt 2 according to the invention in open form and then closing it so as to be endless. For this, each belt 2 has a first traction means end 2a or belt end 2a, and a second traction means end 2b or belt end 2b opposite this in the longitudinal direction X. Each second belt end 2b is provided with a recess 29b arranged centrally in the transverse direction Y and extending over a third of the belt width in the transverse direction Y, which geometrically corresponds to a matching protrusion 29a of the first belt end 2a. In this way, the two belt ends 2a, 2b can be connected together with an overlap in the transverse direction Y. However, different widths of the recess 29b and corresponding protrusion 29a in the transverse direction Y are possible, e.g. a quarter, a half or similar.

Then, the two overlapping belt ends 2a, 2b may be secured and connected together as described above for the carrier bars 24, wherein, instead of the carrier bar 24, a respective outer holding element 27 is used which could also be described as an outer transverse element 27. Several such mechanical connections providing form fit and force fit may be arranged over the entire region of the overlap in the longitudinal direction X, in order to increase their effect and create a sufficiently durable connection which can transmit the forces or power of the inclined conveyor 12 in the longitudinal direction X.

LIST OF REFERENCE SYMBOLS (PART OF THE DESCRIPTION)

X Longitudinal direction; depth
Y Transverse direction; width
Z Vertical direction; height
1 Combine harvester
10 Reel
11 Intake channel; shaft
12 Inclined conveyor
13 Drive roller
14 Deflecting roller
2 Traction means; belt
2a First traction means end; first belt end
2b Second traction means end; second belt end
20 Traction means body; belt body
21 Teeth
21a Recesses in traction means body 20 or teeth 21
22 Tension strand; tension member cable; steel cables; polyester cables; aramide cables; carbon cables
22a Region free from tension strands
23 Passage openings
24 Carrier bars
25 Fixing means; bolts
26 Inner holding elements; inner transverse elements
27 Outer holding elements; outer transverse elements
28 Tooth-free regions
29a Protrusion of first traction means end 2a
29b Recess of second traction means end 2b
3 Crop; cereal

The invention claimed is:

1. A traction means for an inclined conveyor of a combine harvester, the traction means comprising a traction means body which extends substantially in a longitudinal direction (X) of a belt and is endlessly closed or designed to be endlessly closable;
wherein at least one tension strand which runs in the longitudinal direction is embedded in the traction means body and is enclosed by the traction means body;
wherein the at least one tension strand is a plurality of tension strands embedded in the traction means body in a same plane; and,
wherein the tension strands are arranged spaced apart from each other in a transverse direction (Y) in the same plane.

2. The traction means as claimed in claim 1, wherein the traction means is a belt.

3. The traction means as claimed in claim 1, wherein at least one region free from tension strands lies between at least two of the plurality of tension strands in a transverse direction (Y).

4. The traction means as claimed in claim 3, wherein in the at least one region free from tension strands, the traction means body has at least one passage opening which extends through the traction means body in a vertical direction (Z).

5. The traction means as claimed in claim 1, wherein the traction means body comprises polyurethane.

6. The traction means as claimed in claim 1, wherein the traction means body consists of polyurethane.

7. The traction means as claimed in claim 1, wherein the at least one tension strand comprises as a material selected from the group consisting of steel, polyester, aramide, glass fiber, carbon, and mixtures thereof.

8. The traction means as claimed in claim 1, wherein the at least one tension strand consists of steel, polyester, aramide, glass fiber or carbon.

9. The traction means as claimed in claim 1, wherein a plurality of teeth which each extend in a vertical direction (Z) toward the same side of the traction means body and in a transverse direction (Y), and are spaced apart from each other in the longitudinal direction (X).

10. The traction means as claimed in claim 9, wherein at least two teeth of the plurality of teeth are spaced apart from each other in the longitudinal direction (X) by a tooth-free region, and wherein width of the tooth-free region corresponds to width of a tooth.

11. The traction means as claimed in claim 1, wherein a carrier bar is fixedly connected to the traction means body and extends substantially in a transverse direction (Y), and wherein the carrier bar is connected by at least one fixing means to an inner holder element which extends substantially parallel to the carrier bar in the transverse direction (Y);
wherein the carrier bar and the inner holder element surround at least portions of the traction means body on both sides in a vertical direction (Z); and,
wherein one or more of the carrier bar, the fixing means, or the inner holder element are arranged in a recess of the traction means body.

12. The traction means as claimed in claim 11, wherein the carrier bar is connected to the inner holder element by a pair of the fixing means.

13. The traction means as claimed in claim 11, wherein the recess is arranged in a tooth.

14. The traction means as claimed in claim 1, wherein the traction means has at least two traction means ends in the longitudinal direction (X), by which the traction means is endlessly closed or designed to be endlessly closable; and,
wherein the two ends (2a, 2b) overlap in the transverse direction (Y) and/or in the vertical direction (Z) or are designed to overlap in the transverse direction (Y) and/or the vertical direction (Z).

15. The traction means as claimed in claim 1, wherein at least one outer holder element which is connected by means of at least one fixing means to an inner holder element which extends substantially parallel to the at least one outer holder element in a transverse direction (Y);

wherein the at least one outer holder element and the inner holder element surround at least portions of the traction means body on both sides in a vertical direction (Z); and, wherein the one or more of the outer holder element, the fixing means or the inner holder element is arranged in a recess of the traction means body.

16. The traction means as claimed in claim 1, wherein the at least one outer holder element is connected to the inner holder element with a pair of the fixing means.

17. The traction means as claimed in claim 15, wherein the recess is arranged in a tooth.

18. An inclined conveyor for a combine harvester the traction means as claimed in claim 1.

19. A combine harvester comprising the inclined conveyor as claimed in claim 18.

* * * * *